United States Patent [19]

Hayashi et al.

[11] 4,253,123

[45] Feb. 24, 1981

[54] CONTROL DEVICE FOR A RECORDING AND REPRODUCING APPARATUS

[75] Inventors: Yoshinobu Hayashi, Yokohama; Yoshinori Yamamoto, Tokyo; Tadao Fujita, Yokohama, all of Japan

[73] Assignee: Sony Corporation, Tokyo, Japan

[21] Appl. No.: 2,994

[22] Filed: Jan. 12, 1979

[30] Foreign Application Priority Data

Jan. 19, 1978 [JP] Japan .................................. 53-4729

[51] Int. Cl.³ ...................... G11B 15/18; G11B 19/02
[52] U.S. Cl. ....................................... 360/69; 360/137
[58] Field of Search ..................... 360/69, 61–62, 360/137, 74.1, 71, 90, 96.3, 96.4; 242/201, 198–200, 186

[56] References Cited

U.S. PATENT DOCUMENTS

| 3,940,800 | 2/1976 | Tabuchi | 360/137 |
| 4,015,090 | 3/1977 | Kitada | 360/62 X |
| 4,115,822 | 9/1978 | Kunihiko et al. | 360/62 X |

Primary Examiner—John H. Wolff
Attorney, Agent, or Firm—Lewis H. Eslinger; Alvin Sinderbrand

[57] ABSTRACT

Mode changing in a tape recorder/reproducer is effected by means of the tape drive motor and a cam driven linkage under the control of a solenoid, and the timing of the energization of the solenoid within the control cycle determines the mode of the recorder/reproducer which is established.

22 Claims, 10 Drawing Figures

CONTROL DEVICE FOR A RECORDING AND REPRODUCING APPARATUS

BACKGROUND OF THE INVENTION

1. Field of the Invention

This invention relates to the control of a tape recorder/reproducer using the tape drive motor to provide force for achieving mode changing under control of a solenoid.

2. Description of the Prior Art

The prior art contains examples of a mode control mechanism for a tape recorder using small capacity solenoids for selecting respective operating modes and employing a flywheel driven by the tape drive motor as the source of the principal motive force for change-over from one operating mode to another. The devices in the prior art generally require a plurality of solenoids, for example, a separate solenoid for each mode, such as, record, reproduce, fast forward and so forth, into which it is desired to place the tape recorder. The large number of solenoids with their supports and wiring increase the size, weight, cost, complexity and power drain of the tape recorder.

OBJECTS AND SUMMARY OF THE INVENTION

An object of this invention is to provide a control device adapted for use in a recording and reproducing apparatus, and wherein change-over between a plurality of different operating modes can be accomplished under the control of a single solenoid.

Another object of this invention is to provide a control device for a recording and reproducing apparatus which allows easy change-over between a plurality of operating modes by timed control of the energization of a single solenoid.

Still another object of this invention is to provide a control device in a tape recording and reproducing apparatus, wherein actuation of the solenoid for controlling mode change-over and the movement of a magnetic head and pinch roller to an operating position are synchronized.

A further object of this invention is to provide a control device, as aforesaid, wherein control signals for controlling energizing of the solenoid are timed in response to rotational speed signals corresponding to the rotation of the tape drive motor to allow accurate operational timing of the energization of the solenoid and, hence, of the mode change-over.

A further object of this invention is to provide a control device for a tape recording and reproducing apparatus, as aforesaid, which allows control of the mode of operation by means of a small capacity solenoid.

A still further object of this invention is to provide a control device for a tape recording and reproducing apparatus having a simplified mode change-over mechanism.

An additional object of this invention is to provide a control device for a tape recording and reproducing apparatus which permits a reduction in the size and manufacturing cost of the apparatus.

According to an aspect of the invention, in a recording and reproducing apparatus having a stopped condition and at least first and second operating modes and a drive motor, a control device comprises actuating means driven by the drive motor for changing between the stopped condition and one of said first and second operating modes, electrically controlled means for initiating the function of the actuating means, and means responsive to a characteristic of a signal to the electrically controlled means for selectively preventing changing to the second mode.

According to another aspect of the invention, the control device for the recording and reproducing apparatus comprises a solenoid, eccentric means rotatable about an axis, first means actuated by the solenoid and driven by the drive motor for turning the eccentric means through a part of a revolution from a first angular position to a second angular position and for holding the eccentric means in its second angular position, mode changing means having at least first and second conditions and being acted upon by coupling means actuated by the eccentric means for changing the mode changing means from its first to its second condition, and means actuated by the solenoid for preventing the coupling means from actuating the mode changing means in response to the previously mentioned characteristics of an energization signal applied to the solenoid. Further, means actuated by the solenoid are provided for rotationally returning the eccentric means from its second angular position back to its first angular position.

The above, and other objects, features and advantages of the present invention, will become apparent from the following description read in conjunction with the accompanying drawings in which like reference numerals designate the same elements.

DETAILED DESCRIPTION OF PREFERRED EMBODIMENTS

Figure 1:
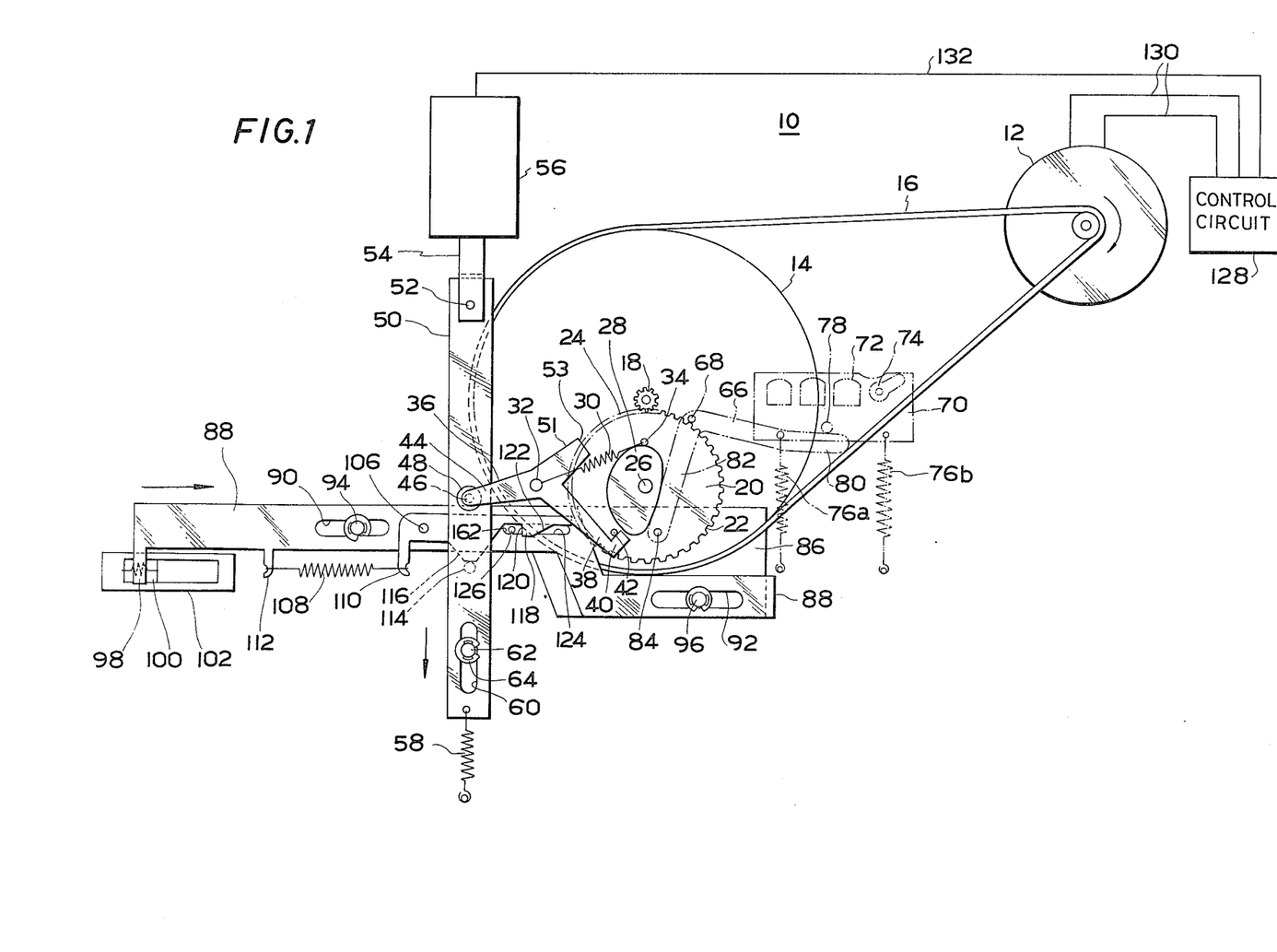
FIG. 1 is a schematic plan view of a control device for a recording and reproducing apparatus according to an embodiment of the present invention.

Referring to FIG. 1, there is shown generally at 10 an embodiment of a control device for a tape recording and reproducing apparatus according to the present invention. A tape drive motor 12, which operates continuously so long as a power supply switch (not shown) of the apparatus is turned on, drives a flywheel 14 through a drive belt 16. A pinion 18 on the axis of the flywheel 14 is thus continuously rotated.

The pinion 18 is disposed adjacent a partly toothed gear 20 having a toothed region 22 and an untoothed region 24 on its perimeter. In the illustrated position of partly toothed gear 20, the untoothed region 24 is adjacent pinion 18 so that the latter can rotate while gear 20 is at rest. The partly toothed gear 20 is rotatable about a shaft 26 which is affixed to a base plate (not shown). An eccentric actuating cam 28 is attached to rotate with partly toothed gear 20. A spring 30 biased between a post 32 affixed to the base plate (not shown) and a pin 34 on partly toothed gear 20 urges partly toothed gear 20 in a counterclockwise direction about its axis 26 when partly toothed gear 20 is positioned as shown on FIG. 1. A three-legged lever 36, is turnable about post 32 and includes a first leg 38 having a hook 40 at its end, a second leg 44 having a pin 46 protruding therefrom and a third leg 51 having an abutment surface 53 at its end. The hook 40 is engageable with a pin 42 protruding from partly toothed gear 20 to prevent counterclockwise rotation of the partly toothed gear 20 under the urging of spring 30 from the position shown on FIG. 1. The pin 46 protruding from second leg 44 of three-legged lever 36 engages a hole 48 in an operating slide 50. The abutment surface 53 of third leg 51 of three-legged lever 36 is also engageable by pin 42, as hereinafter described, to form another stop for partly toothed gear 20 in the course of the operation of control device 10. The slide 50 is attached by any suitable means, such as a rivet 52, to an armature 54 of a control solenoid 56. A return spring 58 urges slide 50 and armature 54 downward, as viewed on FIG. 1. A guide slot 60 in slide 50 receives a guide post 62 affixed to the base plate (not shown) and guides the lower end of slide 50 which is retained on guide post 62 by any suitable means, such as a C-ring 64.

An L-shaped lever 66 is pivotable about a pivot pin 68 which is affixed to the base plate (not shown). A head board or carriage 70 carrying record or reproduce heads 72 and a pinch roller 74 is urged to an inactive position, that is, in the downward direction as viewed on FIG. 1, by return spring 76a and 76b. A pin 78 on head board 70 is engageable by one leg 80 of L-shaped lever 66. The downward urging of return springs 76a and 76b acting through pin 78 tends to rotate L-shaped lever 66 in a clockwise direction, as viewed on FIG. 1. A second leg 82 of L-shaped lever 66 bears against the peripheral cam surface of eccentric actuating cam 28. The second leg 82 of L-shaped lever 66 is also pivotally connected, as by a pivot 84, to an idler bar 86. As the L-shaped lever 66 turns about its axis 68, head board or carriage 70 is moved up and down, that is, to and from an operative position, and idler bar 86 is moved from side to side, as will be later explained.

A control circuit 128 is connected, as indicated at 130, to the tape drive motor 12 for sensing and controlling the speed of the latter. Circuit 128 is further connected, as indicated at 132, with solenoid 56 for controlling the energizing of the latter.

Figure 2:
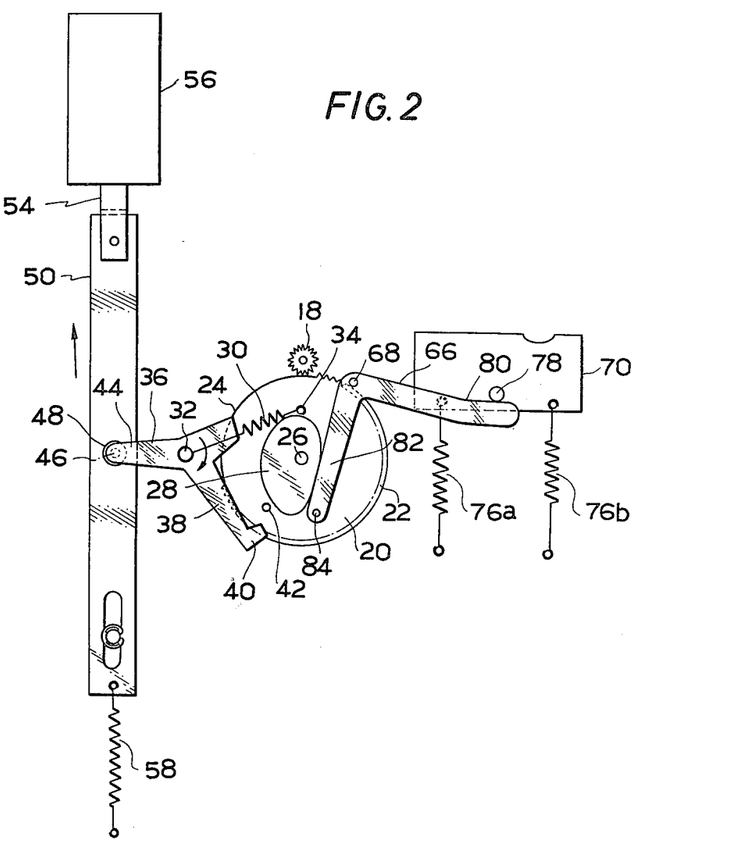
FIG. 2 is a partial plan view of some of the elements of the device shown on FIG. 1, and which are isolated for ease in observing the arrangement and operation thereof.

The control device 10 has the following sequence of operations for establishing the reproducing mode of the tape recording and reproducing apparatus:

When solenoid 56 is energized by control circuit 128, the upward motion of slide 50 against the force of return spring 58 turns three-legged lever 36 in the clockwise direction about post 32. Such turning of three-legged lever 36 immediately moves the legs of three-legged lever 36 into the positions shown in the isolated view of FIG. 2 from which non-essential parts have been omitted for clarity of description. Thus, hook 40 is moved out of engagement with pin 42 thereby permitting spring 30 to turn the partly toothed gear 20 counterclockwise until its toothed portion 22 engages the teeth on continuously rotating pinion 18. Partly toothed gear 20 is thereupon further turned counterclockwise by pinion 18.

Figure 3:
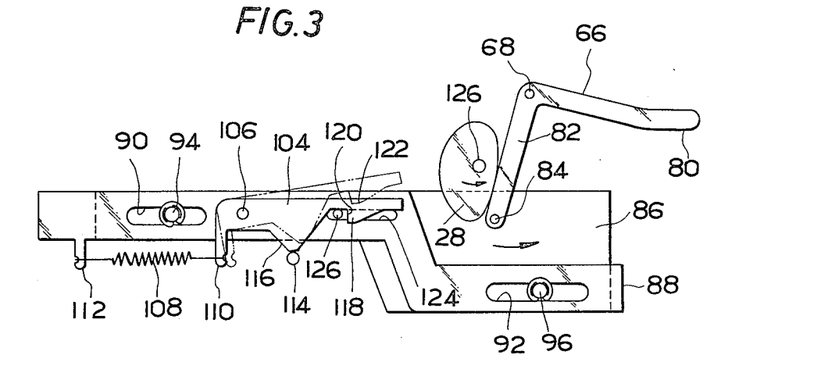
FIG. 3 is a partial plan view of other elements of the device shown on FIG. 1, and which are isolated for ease in observing the arrangement and operation thereof.

Referring to the isolated view of FIG. 3, it will be seen that cam plate 104 is turned about its pivot 106 to the position depicted in dot-dash lines in response to the upward movement of pin 114 with slide 50. The eccentric actuating cam 28 turns with partly toothed gear 20 in the direction of the arrow of FIG. 3 and, in bearing against the leg 82 of L-shaped lever 66, begins turning L-shaped lever 66 counterclockwise about its axis 68. The pin 84 connecting the end of leg 82 with idler bar 86 begins moving the idler bar toward the right. At the same time, the leg 80 of L-shaped lever 66, in bearing against pin 78 on head board 70 (FIGS. 2 and 3), begins moving head board 70 upward, that is, toward the operative position. If solenoid 56 remains energized during this procedure, the abutment face 120 of hook 118, being elevated by the turning of cam plate 104 to the position shown in dot-dash lines on FIG. 3, remains disengaged from actuating pin 126. Consequently, actuating pin 126 slides rightward in elongated slot 124 with the rightward movement of idler bar 86 without causing corresponding movement of switch actuating bar 88. As a result, switch actuating bar 88 remains in its reproduce position shown on FIG. 1 while idler bar 86 moves to the right. The control element 100 of record-reproduce switch 102 consequently stays in the illustrated reproduce position while the head board 70 is moved to its operative position for contacting heads 72 and pinch roller 74 with the magnetic tape (not shown).

Figure 4:
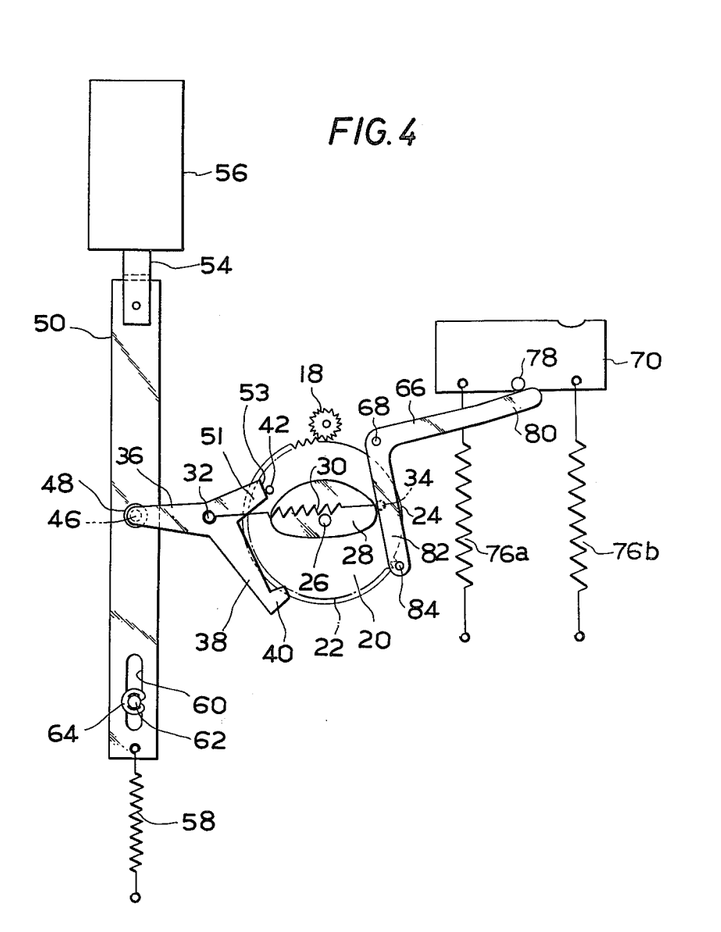
FIG. 4 is a partial plan view similar to FIG. 2, but showing the respective elements in a different condition during operation of the device.

At the completion of the above operating sequence, the operating condition shown in the isolated view of FIG. 4 is achieved. As long as solenoid 56 remains energized, armature 54 holds slide 50 in the upward position and maintains three-legged lever 36 in the position shown on FIG. 4, and in which abutment surface 53 of third leg 51 is engageable by pin 42 and prevents further counterclockwise rotation of partly toothed gear 20 under the urging of spring 30. With pin 42 bearing against abutment surface 53, toothed region 22 of partly toothed gear 20 is held out of contact with pinion 18. The lobe of eccentric actuating cam 28 holds L-shaped lever 66 in its extreme counterclockwise rotational position about its pivot 68 and thus holds head board 70 in its fully upward, or operative position for reproducing of signals recorded on a tape, while idler bar 86 is held in its fully rightward position.

Figure 5:
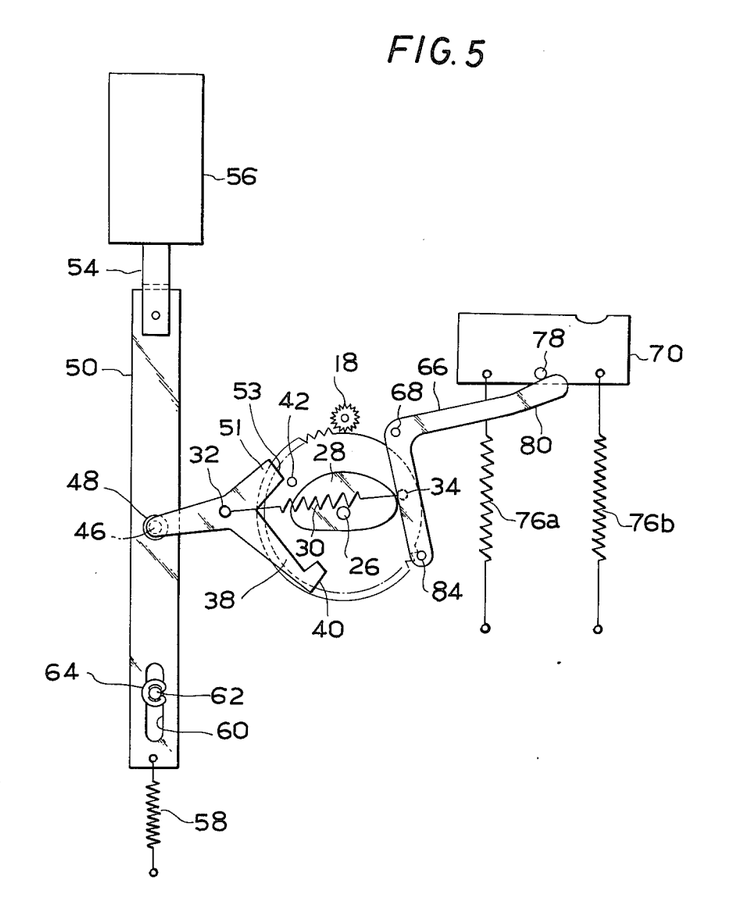
FIG. 5 is a partial plan view similar to FIG. 4, but showing a subsequent condition of the elements.

When solenoid 56 is deenergized, return spring 58 moves slide 50 in the downward direction and consequently turns three-legged lever 36 in the counterclockwise direction about post 32 to the position shown on FIG. 5. This turning of lever 36 disengages abutment surface 53 of third leg 51 from pin 42 and permits spring 30 to rotate partly toothed gear 20 and eccentric actuating cam 28 in the counterclockwise direction back toward the stopped position shown in FIG. 1. The rotation of eccentric actuating cam 28 in this fashion permits L-shaped lever 66 to be turned clockwise under the urging of return springs 76a and 76b acting on head board or carriage 70 for moving the latter to its inoperative position while idler bar 86 is moved leftward in the drawing. As idler bar 86 moves leftward, pin 126 rides under hook 118 of cam plate 104 until abutment face 120 again engages actuating pin 126 to reestablish the condition shown on FIG. 1. Finally, the stopped condition is reached when pin 42 on gear 20 is again held by hook 40.

Figure 6:
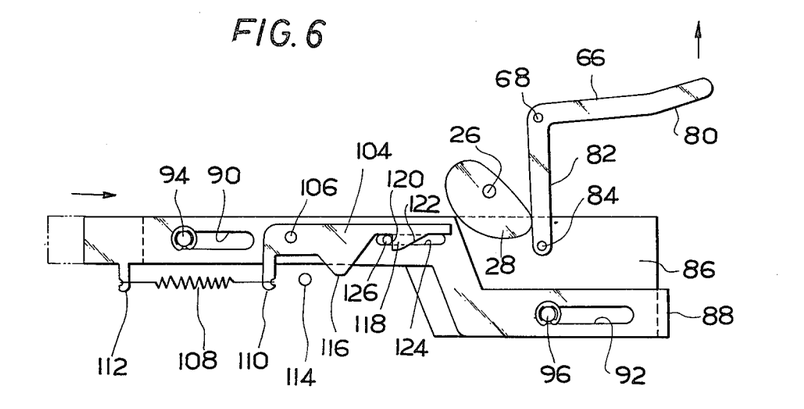
FIG. 6 is a partial plan view similar to FIG. 3, but showing the respective elements in a different operational position.

The following sequence of operations of the control device 10 occurs when establishing the recording mode of the tape recording and reproducing apparatus:

Returning again to FIGS. 1 and 2, it will be appreciated that, if solenoid 56 is only momentarily energized to release pin 42 from hook 40 and to establish the engagement of pinion 18 with the toothed region 22 of partly toothed gear 20 and then is again deenergized, cam plate 104 is permitted to return to its solid line position shown on FIG. 3 before actuating pin 126 has passed abutment face 120 of hook 118. Consequently, as idler bar 86 is moved rightward in response to rotation of eccentric actuating cam 28 and the resulting turning of lever 66, actuating pin 126 engages abutment face 120, as shown on FIG. 6, and displaces cam plate 104 and switch actuating bar 88 toward the right, as shown by the arrow. This motion of switch actuating bar 88 moves control element 100 of record-reproduce switch 102 rightward to its record position. The rightward motion of cam plate 104 moves its cam 116 away from the possibility of contact with pin 114 on slide 50. Solenoid 56 may then be reenergized to turn three-legged lever 36 in the clockwise direction to the position of FIG. 4 in which abutment surface 53 is engaged by pin 42 to properly stop the rotation of the partly toothed gear 20 in the operative position. Since there is no engagement of cam 116 with pin 114, cam plate 104 remains in its counterclockwise position shown on FIG. 6 and actuating pin 126 engages face 120 to draw the cam plate 104 and the attached switch actuating bar 88 fully to the right and thus to actuate record-reproduce switch 102 fully into its record position.

When solenoid 56 is deenergized at the end of a recording operation, lever 36 is turned to release abutment surface 53 from pin 42 and thereby permit the return of gear 20 and the other elements of device 10 to their original positions, as described above in connection with the termination of a reproducing operation. In the course of such return movement of idler bar 86 the leftward motion of actuating pin 126 causes the latter to bear against the left end 162 of elongated slot 124, and thereby returns switch actuating bar 88 and control element 100 to the reproduce positions shown on FIG. 1. Thus, upon deenergization of solenoid 56, record-reproduce switch 102 is always returned to the reproduce position in preparation for the next operation.

Figure 7:
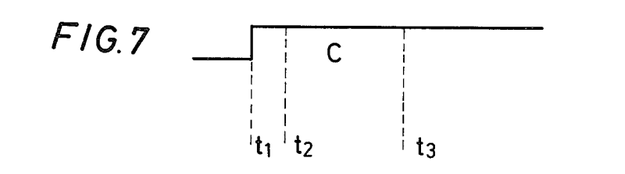
FIG. 7 shows an energization signal effective to establish the reproducing mode of the recording and reproducing apparatus.

The sequence of signals to solenoid 56 for establishing the reproducing mode is shown on FIG. 7. At time $t_1$, solenoid 56 is energized and, in order to achieve the reproducing mode, solenoid 56 is continuously energized, as previously described, thus permitting head board or carriage 70 to be displaced to its operative position without changing record-reproduce switch 102 from its reproduce position.

Figure 8:
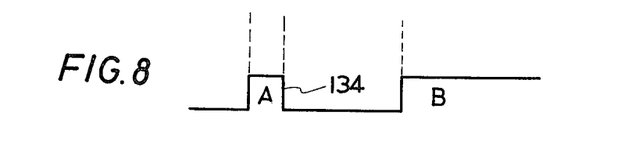
FIG. 8 shows an energization signal effective to establish the recording mode of the recording and reproducing apparatus.

The sequence of signals to solenoid 56 for establishing the recording mode is shown on FIG. 8. Energizing of the solenoid for a short interval, as at 134 between times $t_1$ and $t_2$, initiates the motion of partly toothed gear 20. At time $t_2$, idler bar 86 has not moved far enough to prevent engagement of the face 120 of hook 118 by actuating pin 126. Consequently, when solenoid 56 is deenergized at time $t_2$, cam plate 104 is returned to the position shown on FIGS. 1 and 6 and switch actuating bar 88 is displaced to the right by engagement of actuating pin 126 with face 120, as previously explained. Thereafter, at time $t_3$, the solenoid is again energized, as indicated at B on FIG. 8, in order to move the three-legged lever 36 into the position shown on FIG. 4. Time $t_3$ can be any time during the turning of partly toothed gear 20 after cam 116 has been moved out of the possibility of contact with pin 114 and before pinion 18 becomes disengaged from the toothed region 22 of partly toothed gear 20.

It will be apparent to one skilled in the art that more than two functions can be controlled by properly timing the energization signals to the single solenoid 56. For example, record-reproduce switch 102 may have three functional positions including, for example, a reproduce position at one extreme of its range of movement, a record position at the other extreme of its range of movement and a third function, such as, an erase operation or the like, at an intermediate position between the extremes. A second hook (not shown) could be provided on cam plate 104, and, by suitably timing the reenergization of the solenoid, hook 118 or the second hook (not shown) could be selectively engaged by the actuating pin 126 for thereby placing the record-reproduce switch 102 in the selected position.

Figure 9:
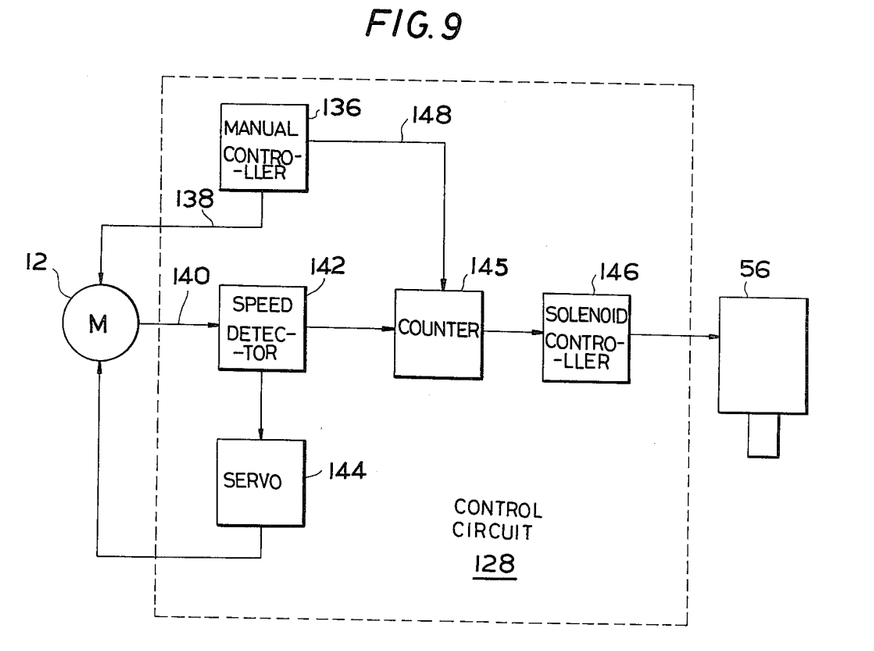
FIG. 9 schematically shows a digital form of a control circuit that may be employed with the device of FIG. 1.

Referring to FIG. 9, one embodiment of control circuit 128 is shown which employs a digital technique for controlling the timing of solenoid 56. A manual controller 136 which may include switches and other controls (not shown) may directly provide a drive voltage on a line 138 to tape drive motor 12. A speed signal generator in tape drive motor 12, such as a pulse generator (not shown), generates an output pulse one or more times per revolution of the motor shaft, and such output pulses are supplied as a speed signal on a line 140 to a speed detector 142. Depending on whether the frequency of the pulses constituting the speed signal is too fast or too slow with respect to a reference, speed detector 142 generates a signal for servo 144 which is thereupon effective to increase or decrease the motor speed in order to achieve and maintain the desired motor speed. The output pulses representing the speed of motor 12 are also supplied through detector 142 to a counter 145. When counter 145 has accumulated predetermined numbers of input pulses after being activated by a command signal on a command line 148, counter 145 applies a signal to a solenoid controller 146. The solenoid control command line 148 from manual controller 136 to counter 145 determines the control functions to be performed by solenoid controller 146. For example, when the reproduce function is selected at manual controller 136, the solenoid controller 146 is commanded to energize the solenoid 56 and to maintain it in the energized condition, as shown in the waveform of FIG. 7, so long as a reproducing operation is being performed. Alternatively, if the recording function is selected at manual controller 136, the solenoid controller 146 is made to produce the pulsed waveform shown on FIG. 8 under the control of the counter 145. In other words, counter 145 is activated by a command signal on line 148 indicating selection of the recording function and counts the pulses representing motor speed. Upon the counting of a first number of such pulses in the interval A on FIG. 8, counter 145 signals controller 146 to deenergize solenoid 56, as at the time $t_2$, and, thereafter, upon the further counting of a second number of the pulses, counter 145 signals controller 146 to reenergize solenoid 56, as at the time $t_3$ on FIG. 8. It will be appreciated that, in the control circuit 128 of FIG. 9, the control of the deenergizing and reenergizing of the solenoid 56 on the basis of the pulses counted by counter 145 ensures that such deenergizing and reenergizing will occur with the gear 20, and hence the other parts of control device 10, in precisely predetermined positions for ensuring correct mode selection by the device 10.

Figure 10:
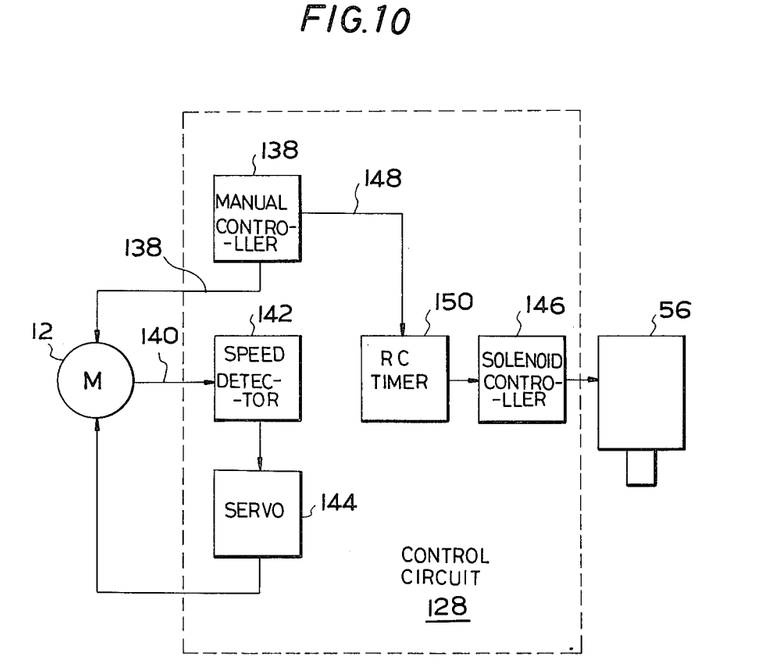
FIG. 10 shows a block diagram of an analog form of a control circuit that may be employed with the device of FIG. 1.

Referring now to FIG. 10 in which like reference numerals indicate like apparatus, it will be seen that a control circuit 128 for use with a device according to this invention may employ a resistance capacitance time constant timer 150 which may be substituted for the counter 145 of the control circuit of FIG. 9. The timer 150 receives a command signal on solenoid control command line 148 and provides a selected time signal to solenoid controller 146. Timer 150 may be appropriately enabled to produce the solenoid energizing signal on FIG. 7 or on FIG. 8 depending on the command on the command line 148. Speed signals from tape drive motor 12 may be optionally omitted from timer 150 which thereupon relies on predetermined time constants to properly time the deenergization and reenergization of solenoid 56 as shown on FIG. 8 when the recording mode is selected.

Having described specific embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A control device for a recording and reproducing apparatus having a stopped condition and at least first and second operating modes and a drive motor comprising: a solenoid, eccentric means rotatable about an axis, first means made operative upon energizing of said solenoid and driven by said drive motor for turning said eccentric means through a part of a revolution about said axis from a first angular position to a second angular position and for holding said eccentric means in its second angular position, mode changing means having at least first and second conditions, coupling means actuated by said eccentric means for changing said mode changing means from said first condition to said second condition, means actuable by said solenoid for preventing said coupling means from actuating said mode changing means into its second condition in response to a selectable characteristic of an energization signal applied to said solenoid, and means also actuable by said solenoid for rotatably returning said eccentric means from said second to said first angular position.

2. The control device according to claim 1, wherein said characteristic is a continuous energization signal.

3. The control device according to claim 8, wherein said first means includes a pinion continuously rotated by said drive motor, a partly toothed gear having a toothed portion and an untoothed portion, said partly toothed gear being attached to and rotating with said eccentric means, said untoothed portion being disposed adjacent said pinion in said first and second angular positions, a lever movable between first and second positions by said solenoid, abutment means on said partly toothed gear engageable by said lever when said lever is in its first position to hold said eccentric means in its first angular position, resilient means for rotating said partly toothed gear so as to bring said toothed portion into mesh with said pinion when said lever is moved from its first position to its second position whereby said eccentric means is driven by said pinion and partly toothed gear from said first angular position toward said second angular position, and said abutment means on said partly toothed gear being also engageable with said lever when said lever is in its second position so as to constitute the means for holding said eccentric means in its second angular position.

4. The control device according to claim 1, wherein said mode changing means includes a record-reproduce switch having a reproduce position corresponding to said first condition and a record position corresponding to said second condition.

5. The control device according to claim 4, wherein said coupling means includes idler means movable between first and second positions in response to turning of said eccentric means from said first to said second angular position, switch actuating means connected to said switch, solenoid controllable means for transmitting motion of said idler means to said switch actuating means whereby said switch actuating means is enabled to change said record-reproduce switch from said reproduce to said record position, and said solenoid controllable means is responsive to a condition of said solenoid to prevent said transmitting of the motion of said idler means to said switch actuating means, whereby said record-reproduce switch remains in said reproduce position during motion of said idler means.

6. The control device according to claim 1, further comprising a control circuit for energizing said solenoid, said control circuit having means for continuously energizing said solenoid and alternately operative timing means for intermittently energizing said solenoid in correspondence to predetermined positions of said eccentric means between said first and second angular positions.

7. The control device according to claim 6, wherein said timing means includes a counter responsive to signals corresponding to the rotation of said drive motor.

8. The control device according to claim 6, wherein said timing means includes a resistance-capacitance timer.

9. The control device according to claim 1, further comprising a head board having at least one magnetic head and a pinch roller thereon, and lever means actuated by said eccentric means for moving said head board into an operative position in synchronism with the motion of said eccentric means from said first to said second angular position thereof.

10. A control device for a recording and reproducing apparatus having a motor and at least first and second operating modes comprising: a pinion driven by said motor, a partly toothed gear adapted to be driven by said pinion when in meshing engagement with the latter, an eccentric member integrally turnable with said partly toothed gear, an idler member displaced upon rotation of said eccentric member, an actuating member operative when moved to change the operating mode of said apparatus between said first and second operating modes, coupling means engageable for moving said actuating member in concert with said idler member, a solenoid for controlling said coupling means, control circuit means for applying one of at least first and second timed energization signals to said solenoid, said solenoid being operative in response to said first timed energization signal to disengage said coupling means whereby movement of said actuating member with said idler member is avoided, and said solenoid being operative in response to said second timed energization signal to engage said coupling means whereby movement of said actuating member with said idler member is provided and mode switching is performed.

11. A control device according to claim 10, further comprising a head board carrying at least one magnetic head and a pinch roller and means acted on by said eccentric member for moving said head board to an operative position thereof at which said magnetic head and pinch roller are contacted with a magnetic tape.

12. A control device according to claim 10, further comprising means for timing said timed energization signals in correspondence with rotation of said drive motor.

13. A control device according to claim 10, wherein said timed energization signals are timed by a resistance-capacitance time constant circuit.

14. A control device for a recording and reproducing apparatus having a motor and at least first and second operating modes comprising: a pinion driven by said motor, a partly toothed gear having a toothed portion and an untoothed portion intermittently meshing with said pinion so as to be driven by the latter, an eccentric member integrally turnable with said partly toothed gear, a spring urging said partly toothed gear to rotate to a predetermined position, holding means having a holding position and a release position and being operative in said holding position for holding said partly toothed gear against the force of said spring at a first angular position in which said untoothed portion is adjacent said pinion, an idler member moved upon turning of said eccentric member, an actuating member operative when moved to change the mode of said apparatus, coupling means engageable for transmitting motion of said idler member to said actuating member to produce concerted movement thereof, a solenoid, said solenoid being operative when energized to move said holding means to said release position whereby said partly toothed gear is released and said spring is thereupon effective to turn said partly toothed gear from said first angular position for engaging said toothed portion thereof with said pinion, whereupon said pinion drives said partly toothed gear toward a second angular position at which said toothed portion is again disengaged from said pinion, said solenoid being further operative when energized to disengage said coupling means, control circuit means for applying on of at least first and second energizing signals to said solenoid, said first energizing signal being a continuous signal, said second energizing signal being a discontinuous signal timed to permit said partly toothed gear to begin and complete a cycle but to reengage said coupling means, and said holding means further having means operative in said release position thereof for holding said partly toothed gear in said second angular position against the force of said spring.

15. A control device according to claim 14, further comprising a head board carrying at least one magnetic head and a pinch roller, and means acted on by said eccentric member for moving said head board to an operative position in which said at least one magnetic head and said pinch roller are contacted with a magnetic tape.

16. A control device according to claim 14, further comprising means for timing said timed energization signals in correspondence with rotation of said drive motor.

17. A control device according to claim 14, further comprising a resistance-capacitance time constant circuit for timing said timed energization signals.

18. A control device for a recording and reproducing apparatus comprising:
drive means including an electric drive motor and an eccentric member rotatably driven by said motor;
a first driven member movable by action of said eccentric member between an inoperative position and an operative position;
a second driven member movable by action of said eccentric member from a first position to a second position;
electromagnetic control means;
timing means for intermittently energizing said electromagnetic control means in response to the rotational position of said eccentric member;
change over means for selectively changing over said apparatus in response to action of said second driven member and said electromagnetic control means; and
linkage means selectively coupling said change over means and said second driven member in response to the energization of said electromagnetic control means.

19. A control device according to claim 18, further comprising means for conditioning said eccentric member for rotation in response to energization of said electromagnetic control means.

20. A control device according to claim 25, wherein said drive means includes a partly toothed gear having a toothed portion and an untoothed portion, a pinion driven by said drive motor, resilient means for rotationally urging said gear to positions in which said toothed portion is in mesh with said pinion, first means for holding said partly toothed gear in a first stopped position against the urging of said resilient means and in which said untoothed portion is nonengagingly disposed adjacent said pinion, second means for holding said partly toothed gear in a second stopped position against the urging of said resilient means and in which said untoothed portion is nonengagingly disposed in respect to said pinion; said eccentric member includes eccentric cam means rotatable with said partly toothed gear; said second driven member includes idler means movable from a first position to a second position in response to rotation of said cam means with said partly toothed gear as the latter is rotated from said first stopped position to said second stopped position; said change over means includes switch actuator means movable between primary and secondary positions by the movement of said idler means between said first and second positions thereof, a mode switch operable by said switch actuator means, said mode switch having at least a first mode position and a second mode position corresponding to said first and second operating modes, and said switch actuator means being effective when moving between its primary and secondary positions to move said mode switch to its second mode position, whereby said changing between said stopped condition and said second operating mode is accomplished.

21. A control device according to claim 2, wherein said electromagnetic control means is effective to prevent said switch actuator means from being moved by said idler means.

22. A control device according to claim 3, wherein said electromagnetic control means includes a cam plate attached to one of said switch actuator means and said idler means, a pin on the other of said switch actuator means and said idler means, said cam plate having a hook thereon engageable with said pin for concerted movement of said idler means and said switch actuator means, and a solenoid effective, when energized, to prevent engagement of said hook and said pin whereby said concerted movement is prevented.

* * * * *